United States Patent [19]

Oota

[11] 4,193,320

[45] Mar. 18, 1980

[54] COLLAPSIBLE LEVER DEVICE FOR OPERATING VALVE

[75] Inventor: Kazunari Oota, Hirakata, Japan

[73] Assignee: Kubota Ltd., Osaka, Japan

[21] Appl. No.: 903,482

[22] Filed: May 8, 1978

[51] Int. Cl.$^2$ .............................................. G05G 5/06
[52] U.S. Cl. ........................................ 74/535; 251/95
[58] Field of Search ................. 74/528, 532, 533, 535, 74/536, 537, 546, 547; 251/99, 98, 95, 101

[56] References Cited

U.S. PATENT DOCUMENTS

| 728,590 | 5/1903 | Linn | 74/528 |
|---|---|---|---|
| 1,655,473 | 1/1928 | Michaelson | 74/535 |
| 3,329,394 | 7/1967 | Overbaugh | 74/533 |

Primary Examiner—Kenneth Dorner
Attorney, Agent, or Firm—Armstrong, Nikaido, Marmelstein & Kubovcik

[57] ABSTRACT

A collapsible lever device comprising a main lever mounted on a valve stem extending from the main body of a valve and an auxiliary lever pivoted to the forward end of the main lever. The main lever and the auxiliary lever are provided at the pivoted portion with a lower plate and a contact plate respectively for holding the auxiliary lever in alignment with the main lever. When the auxiliary lever is turned to its unfolded position in alignment with the main lever, the levers provide a single elongated lever. The valve main body has a cover covering the base end of the main lever from above and provided on the edge thereof on the main lever side with an engaging portion in the form of rack grooves, pins or teeth. The auxiliary lever is formed on its upper surface with a pawl engageable with the engaging portion of the cover. A grip lever having a hook at its one end is mounted on the auxiliary lever. When the auxiliary lever is turned to its folded position, the pawl comes into engagement with the engaging portion of the cover to lock the main lever against turning, with the hook in engagement with the main lever to hold the auxiliary lever in its folded position.

10 Claims, 6 Drawing Figures

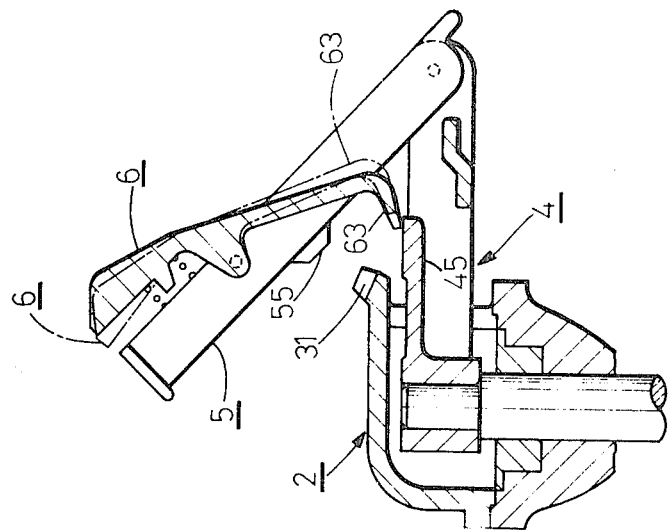
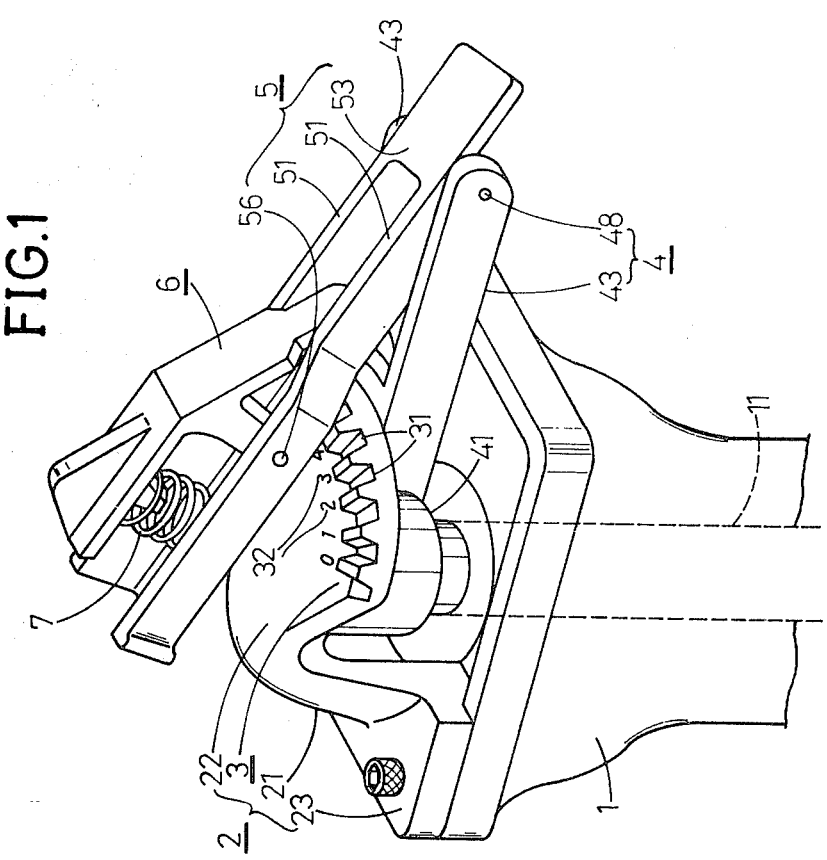

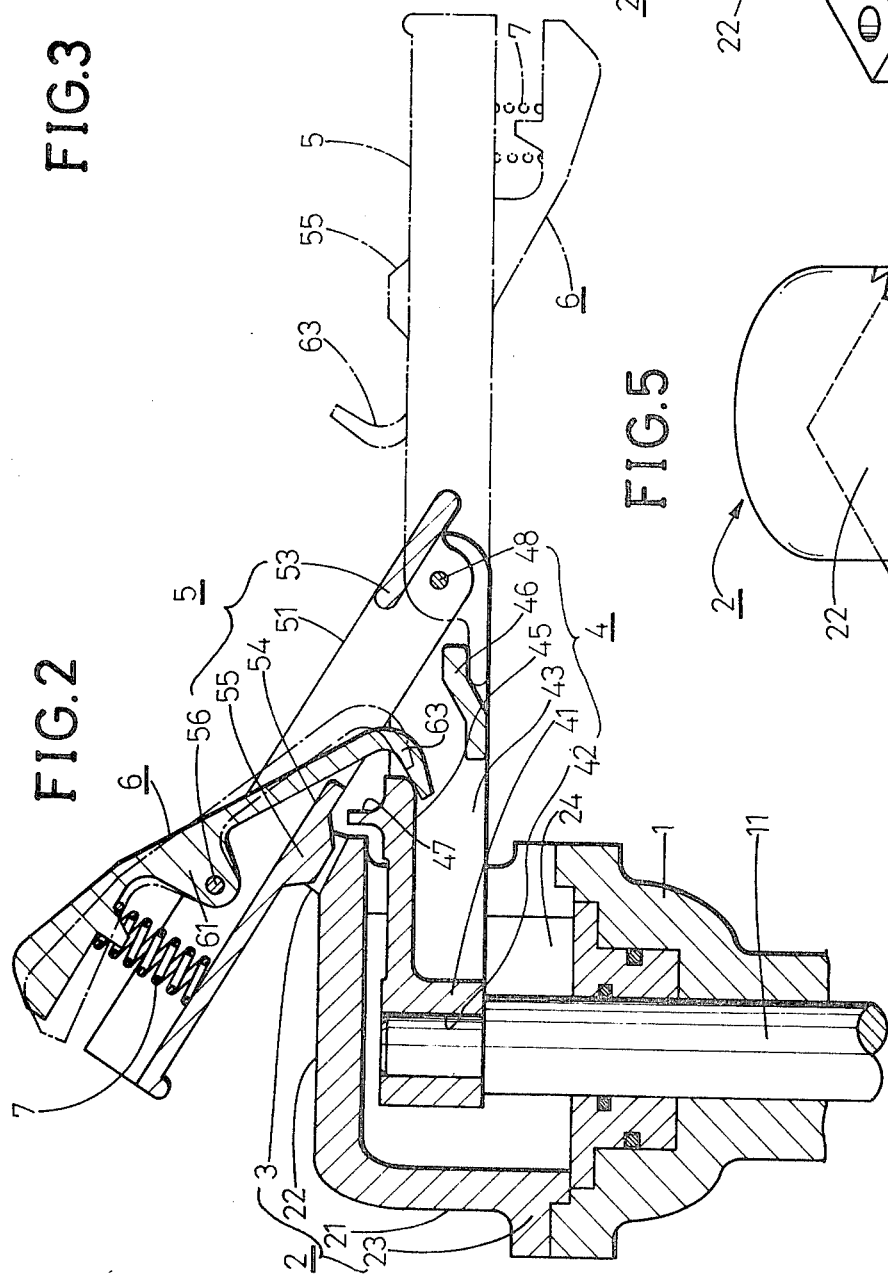
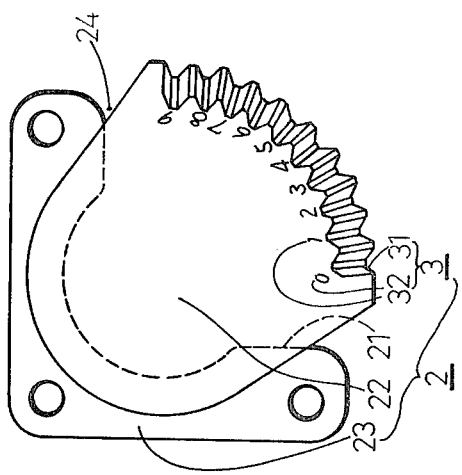
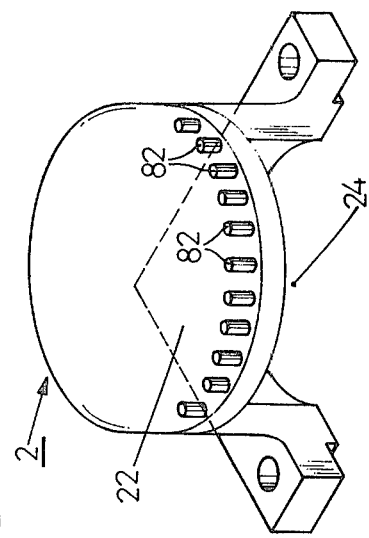
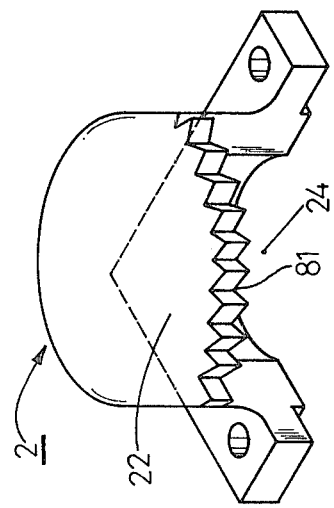

COLLAPSIBLE LEVER DEVICE FOR OPERATING VALVE

BACKGROUND OF THE INVENTION

Levers are generally used for opening and closing valves of small size. The longer the lever, the smaller is the force required to turn the valve disk but the greater is the space needed for operation and transport. Especially when valves are mounted on a plurality of pipelines closely arranged side by side, the levers will interfere with each other when turning and are not smoothly movable.

SUMMARY OF THE INVENTION

The present invention provides a lever device for operating a valve comprising a main lever and a foldable auxiliary lever. When the auxiliary lever is folded, a pawl projecting from the auxiliary lever comes into engagement with an engaging portion fixedly mounted on the main body of the valve to lock the main lever in position with the auxiliary lever held in its folded position. When the auxiliary lever is unfolded, the two levers provide a single elongated lever by which the valve can be opened or closed with a reduced force.

An object of this invention is to provide a valve operating lever which is adapted for use in the limited space available on a pipeline to open and close a valve or to regulate the flow through the pipeline with great ease.

Another object of this invention is to a collapsible lever by which a valve can be operated with a reduced force for flow regulation and which is reliably lockable in the desired position to fix the degree of opening of the valve disk.

BRIEF DESCRIPTION OF THE DRAWINGS

FIG. 1 is a perspective view showing a lever device of this invention as mounted on the main body of a valve and held in its locked position;

FIG. 2 is a view in vertical section showing the same;

FIG. 3 is a plan view of a cover;

FIG. 4 is a sectional view showing an auxiliary lever as disengaged from the cover; and FIGS. 5 and 6 are perspective views showing other embodiments of the cover.

DETAILED DESCRIPTION OF THE INVENTION

A device of this invention for operating a valve comprises a main lever 4 provided with an auxiliary lever 5 and having its base end 41 fixed to the upper end of a valve stem 11 extending from a valve main body 1. A cover 2 covering the base end of the main lever 4 from thereabove is secured to the valve main body 1.

The cover 2 comprises a side wall 21 curved to a semicircular form, a cover plate 22 extending horizontally from the top end of the side wall 21 defining a side opening 24 and a flange 23 projecting from the lower end of the side wall 21 for fixedly mounting the cover 2 on the valve main body 1. The cover 2 covers the upper end of the valve stem 11 and the base end 41 of the main lever 4. The cover plate 22 is provided with a rack plate 3 projecting toward the opening 24 in the form of a sector.

The rack plate 3 has a plurality of rack grooves 31 and a scale 32 for indicating the degree of opening of the valve disk in corresponding relation to the grooves 31.

The main lever 4 is formed in its base end 41 with a bore 42, in which the valve stem 11 fixedly fits to render the main lever 4 turnable with the stem 11. Two parallel arms 43 extend from the base end 41. At the top of the arms 43, an upper plate 45 extends from the base end 41 to the opening 24 of the cover 2. At the bottom of the arms 43, a lower plate 46 is positioned slightly outward from the upper plate 45. The plates 45 and 46 are provided between and joined to the arms 43. A pointer 47 projects upward from the forward end of the upper plate 45.

The auxiliary lever 5 comprises two parallel plates 51 having approximately the same length as the main lever 4 and pivoted at their base ends to the forward ends of the arms 43 by a pin 48. The auxiliary lever 5 is provided at its bottom with a contact plate 53 extending from the pivoted portions of the plates 51. The lever 5 further includes at its top an upper plate 54 extending from the middle of the plates 51 to their forward ends. The contact plate 53 comes into engagement with the lower plate 46 of the main lever 4 when the auxiliary lever 5 is turned to its unfolded position at an angle of approximately 180° with the main lever 4 as indicated in the dot-and-dash line in FIG. 2. The upper plate 54 is provided on its top with a pawl 55 in corresponding relation to the rack plate 3 on the cover 2 and engageable in one of the rack grooves 31.

The auxiliary lever 5 carries between the plates 51 a grip lever 6 positioned below the upper plate 54. The grip lever 6 is pivoted to the lever 5 by a pin extending through the midportion of the grip lever 6. The grip lever 6 has an inner end extending toward the base end of the auxiliary lever 5 and bent at a right angle toward the upper plate 54 to provide a hook 63. A spring 7 provided between the upper plate 54 and the other end of the grip lever 6 biases the lever 6 toward its tilted position, thereby causing the hook 63 to project from the upper plate 54 while the spring 7 is free of compression.

Usually the auxiliary lever 5 is inclined toward the cover 2, with the pawl 55 on the upper plate 54 of the lever 5 in engagement with the desired one of the rack grooves 31 on the cover 2. Additionally the hook 63 of the grip lever 6 is in engagement with the end of the upper plate 45 of the main lever 4 under the action of the spring 7. Thus the hook 63 of the grip lever 6 is held engaged with the upper plate 45. The auxiliary lever 5 is biased toward the cover 2 about the pin 56 by the action of the spring 7. Consequently the lever 5 is completely held in engagement with the grooved portion 31 by gravity and also by the force of the spring 7.

The auxiliary lever 5 thus folded over the main lever 4 prevents the main lever 4 from turning inadvertently and also reduces the length of the lever device, rendering the device advantageous to transport and to use on pipelines arranged in a limited space.

Even if the auxiliary lever 5 in the abovementioned state should be forced upward, the hook 63 of the grip lever 6 pivoted to the lever 5 would engage the upper plate of the main lever 4 to a greater extent, thereby preventing the inadvertent turn of the auxiliary lever 5.

To turn the valve stem 11 and open or close the valve disk or regulate the flow through the valve, the outer end of the auxiliary lever 5 and the grip lever 6 are first gripped at the same time against the spring 7, thereby disengaging the hook 63 from the upper plate 45 of the main lever as indicated in the dot-and-dash line in FIG. 2. The auxiliary lever 5 with the disengaged lever 6 is thereafter turned away from the cover 2, with the result that the contact plate 53 on the lever 5 comes into engagement with the lower plate 46 of the main lever 4. The auxiliary lever 5 is now held in alignment with the main lever 4 as if the two levers were a single elongated lever.

The degree of opening of the valve disk is variable by gripping the outer end of the auxiliary lever 5 in this position and horizontally turning the lever 5. When the auxiliary lever 5 is vertically turned toward the cover 2 with the pointer 47 on the main lever 4 set to a rack groove 31 with the desired graduation of the scale, the hook 63 of the grip lever 6 comes into contact with the upper surface of the upper plate 45 of the main lever 4 as seen in FIG. 4, whereupon the lever 5 and the lever 6 are gripped at the same time to retract the hook 63 upward as indicated in the dot-and-dash line in FIG. 4, and the pawl 55 on the auxiliary lever 5 is fitted in the desired rack groove 31. When the levers 5 and 6 are thereafter released from the hand, the spring 7 forces the hook 63 into engagement with the edge of the upper plate 45 on the main lever 4 while bringing the auxiliary lever 5 into pressing contact with the grooved portion 31.

FIGS. 5 and 6 show other embodiments of the pawl engaging portion of the cover 2. The cover plate 22 shown in FIG. 5 is toothed at its edge defining the opening 24 to provide a sector gear 81. The cover plate 22 shown in FIG. 6 is provided with upright pins 82 equidistantly spaced apart in a row on its upper surface along the edge defining the opening 24. To ensure the same engagement as already described, the pawl 55 of the lever 5 is so formed as to engage with the sector gear 81 or in the space between the pins 82.

While the invention has been particularly shown and described with reference to preferred embodiments thereof, it will be understood by those skilled in the art that the foregoing and other changes in form and details can be made therein without departing from the spirit and scope of the invention.

What is claimed is:

1. In a collapsible lever device for operating a valve including a lever having a base end mounted on a valve stem extending from a main body of the valve to open and close the valve or to regulate the flow through the valve by turning said lever, the improvement comprising:
    a main lever mounted at said base end on the valve stem, said main lever comprising a portion of said lever,
    an auxiliary lever having a pivot at a forward end of the main lever, said auxiliary lever comprising a portion of said lever,
    a cover covering the base end of the main lever from above and mounted on the valve main body,
    holding means disposed at a position between said pivot and said valve stem while said auxiliary lever is in alignment with the main lever when the auxiliary lever is turned to an unfolded position, and
    locking means provided at a position where the auxiliary lever opposes the cover when the auxiliary lever is turned to a folded position.

2. A lever device as defined in claim 1 wherein the holding means comprises a lower plate provided at a forward end lower portion of the main lever and a contact plate projecting from beneath said pivot of the auxiliary lever.

3. A lever device as defined in claim 1 wherein the locking means comprises a pawl projecting from the auxiliary lever and an engaging portion formed on the cover and engageable with the pawl.

4. In a collapsible lever device for operating a valve including a lever having a base end mounted on a valve stem extending from a main body of the valve to open and close the valve or to regulate the flow through the valve by turning said lever, the improvement comprising:
    a main lever mounted at said base end on the valve stem, said main lever comprising a portion of said lever,
    an auxiliary lever having a pivot at a forward end of the main lever, said auxiliary lever comprising a portion of said lever,
    a cover covering the base end of the main lever from above and mounted on the valve main body,
    holding means disposed at a position between said pivot and said valve stem while said auxiliary lever is in alignment with the main lever when the auxiliary lever is turned to an unfolded position,
    locking means provided at a position where the auxiliary lever opposes the cover when the auxiliary lever is turned to an folded position, and
    a grip lever pivoted to the auxiliary lever and having a hook engageable with the main lever for restraining the auxiliary lever from turning toward an unfolded position.

5. A lever device as defined in claim 4 wherein the holding means comprises a lower plate provided at a forward end lower portion of the main lever and a contact plate projecting from beneath said pivot of the auxiliary lever.

6. A lever device as defined in claim 4 wherein the locking means comprises a pawl projecting from the auxiliary lever and an engaging portion formed on the cover and engageable with the pawl.

7. A lever device as defined in claim 6 wherein the cover is provided on the edge thereof on the main lever side with a scale for indicating the degree of opening of the valve, and the main lever is provided with a pointer opposed to the scale.

8. A lever device as defined in claim 6 wherein the engaging portion is in the form of rack grooves formed along an edge of the cover.

9. A lever device as defined in claim 6 wherein the engaging portion is a sector gear formed along an edge of the cover.

10. A lever device as defined in claim 6 wherein the engaging portion comprises a number of upright pins equidistantly spaced apart along an edge of the cover.

* * * * *